United States Patent [19]

Richards

[11] Patent Number: 5,159,491
[45] Date of Patent: Oct. 27, 1992

[54] COMBINATION COLLIMATING LENS AND CORRECTING PRISM

[75] Inventor: David A. Richards, Rochester, N.Y.

[73] Assignee: Eastman Kodak Company, Rochester, N.Y.

[21] Appl. No.: 482,102

[22] Filed: Feb. 20, 1990

[51] Int. Cl.$^5$ .......................... G02B 3/06; G02B 5/04; G02B 13/10

[52] U.S. Cl. .................... 359/641; 359/669; 359/711; 359/719; 359/720; 359/837

[58] Field of Search ............... 350/421, 420, 434, 435, 350/436, 286, 447, 453, 481; 359/668, 669, 711, 712, 720, 737, 744, 795, 831, 837, 641, 718, 719

[56] References Cited

U.S. PATENT DOCUMENTS

| | | | |
|---|---|---|---|
| 1,647,631 | 11/1927 | Ives | 350/421 |
| 3,416,867 | 12/1968 | Biber | 350/436 |
| 3,850,510 | 11/1974 | Baker | 350/286 |
| 4,643,538 | 2/1987 | Wilson | 350/421 |
| 4,759,616 | 7/1988 | Marchant | 350/421 |
| 4,776,652 | 10/1977 | Ih | 350/3.72 |
| 4,872,747 | 10/1989 | Jalkio et al. | 350/421 |

FOREIGN PATENT DOCUMENTS

| | | | |
|---|---|---|---|
| 295296 | 4/1932 | Italy | 350/445 |
| 570638 | 12/1957 | Italy | 350/420 |
| 2042757 | 12/1978 | United Kingdom | 350/436 |

OTHER PUBLICATIONS

Warren J. Smith, "Modern Optical Engineering",: McGraw-Hill, Inc., New York (1966), pp. 239-241.

Melles Griot Catalog, Optics Guide 4, (1988), Section 18, pp. 1-58.

Primary Examiner—Bruce Y. Arnold
Assistant Examiner—David R. Parsons
Attorney, Agent, or Firm—Svetlana Z. Short

[57] ABSTRACT

An optical element for collimating and rectifying divergent incident radiation comprises a first optical surface and a second optical surface titled with respect to the first optical surface. The first optical surface has sufficient power to collimate incident radiation, while the second optical surface is tilted sufficiently to provide rectification.

8 Claims, 1 Drawing Sheet

COMBINATION COLLIMATING LENS AND CORRECTING PRISM

BACKGROUND OF THE INVENTION

1. Field of the Invention

The present invention relates to optics and, more particularly, to a collimating and beam-shaping element. The element of the present invention is particularly suitable for use with laser diodes.

2. Description Relative to the Prior Art

Laser diodes have become a preferred light source for a wide variety of modern day applications. Many of these applications require collimation and rectification. As used herein, collimation means conversion of divergent radiation into a parallel beam, which can subsequently be reshaped at a distance in a variety of optical systems (such as scanners and compact disc players). Rectification, as used herein, means the circularizing of the beam symmetry so that the focus of points of equal intensity form a circle Laser diodes typically have elliptical radiation patterns, i.e., different divergence in planes parallel and perpendicular to the diode junction. Anamorphic optical systems have been described to accomplish rectification by means of cylindrical lenses or refracting prisms. In addition, the natural astigmatism of the diode source requires correction. This can be accomplished by a weak cylindrical lens.

If conventional design and fabrication methods are utilized, satisfying all of the foregoing criteria requires a multi-element optical system which increases size, weight, cost, and assembly difficulties.

SUMMARY OF THE INVENTION

The present invention solves the foregoing problem by combining both the collimating and the rectification features in a single optical element. Collimation is accomplished by the only surface with significant optical power, which faces the incoming diverging radiation. Rectification is done by having the other surface of the optical element tilted with respect to the first surface. The tilted surface may be a plano or a weak cylindrical surface. The term "weak" means that the optical power contributed by the second, tilted surface of the optical element is small when compared to the power of the other surface of the optical element.

DETAILED DESCRIPTION OF THE PREFERRED EMBODIMENT

Figure 1:
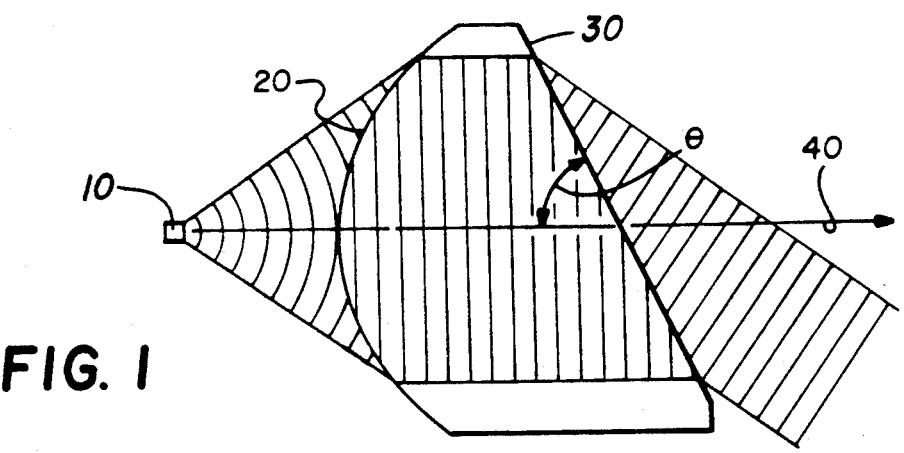
FIG. 1 is a side view of the illustrative preferred embodiment.
Figure 2:
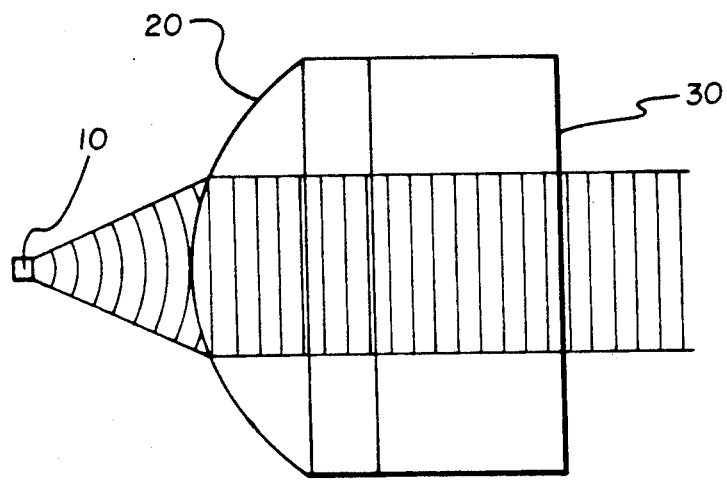
FIG. 2 is a top view of the illustrative preferred embodiment.

In the preferred illustrative embodiment, shown in FIG. 1, the first surface 20, facing the diode 10, is defined as a Cartesian surface, which in the case of an air-to-glass interface is hyperbolic in cross-section. However, to correct for the source astigmatism, the cross-section would be different in the two orthogonal principal directions (describing a doubly hyperbolic toroid). This can be thought of as a section of a barrel surface where the rings and slats are of hyperbolic cross-section with slightly different vertex radii. Such a surface properly defined for front focus and index of refraction eliminates spherical aberrations and astigmatism if the source is placed on axis.

The second surface 30 is a plano surface placed at an angle $\theta$ to the optical axis 40 defined by the first surface 30. The angle is that which produces the beam condensation in the appropriate axis. The orientation is dictated by the elliptical axes of the now collimated beam.

An example of the design of a particular embodiment of the invention is given below, to provide a collimated circular beam with use of 780 nm laser diode with the output beam of 3-to-1 ellipticity (ratio of major-to-minor axis) and 5 microns of astigmatism.

First, a choice of numerical aperture and preferred glass is made. For example, 0.35 is chosen for a numerical aperture and a glass is chosen with a index (N) of 1.750 at 780 nm (low dispersion would also be preferable). If the desired beam is 5 mm in diameter, the clear aperture (CA) of the first surface must be 15 mm to accommodate for the size of the incoming beam. Because the beam is collimated inside the glass, front focus (FF) is the focal length (FL). For a Cartesian hyperbolic surface the conic constant (K) should be the negative square of the index (K) should be the negative square of the index ($K = -N^2$). Accordingly, the lens is corrected for spherical aberration. However, a general asphere can be used for the same purpose. The vertex radius (VR) is the front focus times the index minus one (VR = FF*(N−1)). With an astigmatic source we have two such definitions:

$$VR1 = FF * (N-1)$$

$$VR2 = (FF + \Delta F) * (N-1)$$

where $\Delta F$ is the astigmatism of the source in the same units as the focal length. If the optical axis is defined as the X direction, the major axis of ellipticity as the Y direction, the minor axis as the Z direction, and if the origin is at the vertex of the aspheric surface, the surface is defined with the following equations:

X-Y PLANE CROSS-SECTION $$X = \frac{1}{(K+1)} [VR1 - \sqrt{(VR1)^2 - (K+1)Y^2}]$$

X-Z PLANE CROSS-SECTION $$X = \frac{1}{(K+1)} [VR2 - \sqrt{(VR2)^2 - (K+1)Z^2}]$$

The entire surface is generated by rotating the cross section in the X-Z plane (maintaining perpendicularity to the X-Y plane) so that it is along the direction normal to the curve in the X-Y plane.

The second surface is defined planar but tilted at an angle theta ($\theta$) to the optical axis in the X-Y plane. The angle can be computed from the following equation:

$$\theta = \cos^{-1}\left[\sqrt{\frac{R^2 - 1}{N^2 R^2 - 1}}\right]$$

where R is the compression ratio and N is the index of refraction. For R=3 and N=1.750, $\theta = 56.72°$ which gives an angle of incidence of 33.28° which is less than the critical angle for total internal reflection ($I_c = 34.85°$).

The choice of center thickness is reasonably arbitrary, limited by size (on the high side) and edge thickness (on the low side). A CT of 3.00 mm is chosen here. The combination of front focus and sag at the clear aperture are known from the following equations:

$$NA = n \sin \theta$$

(in this case $n=1$ for air; $\theta'$ is the half-angle at the source)

$$\tan \theta' = \frac{(CA/2)}{FF + SG}$$

where SG is the sag ($X_{CA}$) from above. Both SG and FF are functions of the vertex radius. $FF = VR/(N-1)$. This can be solved by Newton's iteration method. We then have $FF = 18.266$ mm; $SG = 1.807$ mm, and $VR = 13.70$ mm. $K = -3.0625$ is the required conic constant.

The alignment of these two surfaces can be accomplished in the tooling which performs the molding. It is of particular interest to note that small errors in center thickness or wedge (angle error) have practically no effect on the quality of the wavefront produced. The alignment of the diode to the lens is the only critical factor. The final product can be anti-reflection coated for greater energy efficiency.

Figure 3:
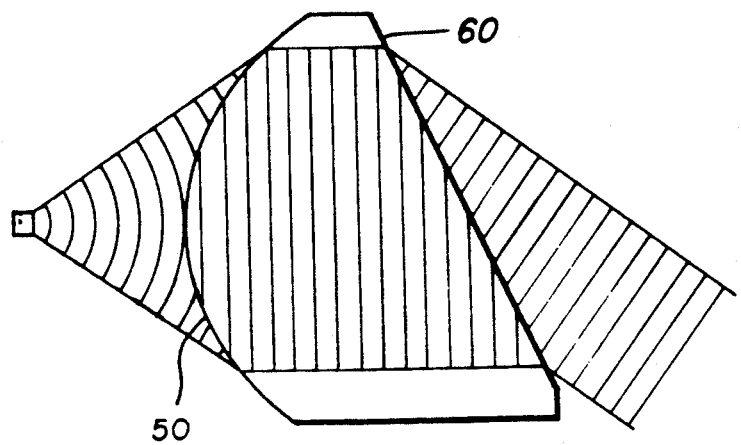
FIG. 3 is a side view of an alternative illustrative embodiment.

FIG. 3 shows a second illustrative embodiment of the present invention. An alternative approach to having a toroidal first surface shown in the first illustrative embodiment, is to have a spherical surface as the first surface 50 of the element and to have a second surface 60 of the element to contribute a very weak cylindrical power to offset the astigmatism. However, since in this case the tilted surface has optical power, it can introduce other field aberrations, for example, coma and, thus somewhat degrade the overall performance of the optical system.

The lens unit can be compensated for the window incorporated in the diode package or, alternatively the lens elements can replace the laser diode window, in which case athermalization can be achieved in the combined packaging of the lens elements and the diode.

Of course, it is known by those skilled in the art that either a glass or plastic can be used in construction of the optical element according to the present invention.

The invention has been described in detail with particular reference to a presently preferred embodiment, but it will be understood that variations and modifications can be effected within the spirit and scope of the invention.

What is claimed is:

1. A single optical element for collimating and rectifying divergent incident radiation, said optical element comprising means defining a first surface of said optical element and said first surface being torroidal and having a curvature for collimating said incident radiation within said element, said first surface having an optical axis; and
means, defining a second surface of said optical element that is tilted at an angle with respect to said axis, for rectifying the radiation collimated by said first optical surface.

2. A single optical element according to claim 1, wherein said first surface has a vertex radius of curvature $VR-$, said vertex radius of curvature being equal the front focal distance $FF-$ times the index of refraction $N-$ minus one, $VR = FF \times (N-1)$.

3. A single optical element according to claim 2, wherein said second surface is tilted by an angle $\Theta$ with respect to said optical axis, said angle $\Theta$ being $$\theta = \cos^{-1}\left[\sqrt{\frac{R^2 - 1}{N^2 R^2 - 1}}\right], \text{wherein}$$

R is a compression ratio used for rectification and N is the index of refraction of the material of which the optical element is formed.

4. A single optical element according to claims 1, 2, or 3, in which said second surface is a plano surface.

5. An optical system for generating a collimated and rectified beam of radiation, said system comprising:
a laser diode source means placed at the front focal plane of a single optical element for providing a divergent laser beam incident upon said optical element, said laser beam having an elliptical radiation pattern;
said single optical element including:
means defining a first surface of said optical element having a curvature for collimating said incident radiation within said element, said first surface having an optical axis, said first optical surface being torroidal; and
means defining a second surface of said optical element that is tilted at an angle with respect to said axis for rectifying the radiation collimated by said first optical surface.

6. An optical system for collimating and rectifying divergent radiation, said optical system comprising:
a laser diode source means placed at the front focal plane of a single optical element for providing a divergent laser beam incident upon said optical element, said laser beam having an elliptical radiation pattern;
said single optical element including a first optical surface having a vertex radius of curvature VR to collimate said divergent incident radiation within said optical element, said vertex radius of curvature being equal to the front focal distance FF times the index of refraction N minus one, $VR = FF \times (N-1)$, said first optical surface having an optical axis, said first optical surface being torroidal;
and means defining a second surface of said optical element that is tilted at an angle with respect to said axis to rectify the radiation collimated by said first optical surface.

7. An optical system according to claim 6, wherein said second surface is tilted with respect to said optical, axis by an angle $\theta$, said angle $\theta$ being $$\theta = \cos^{-1}\left[\sqrt{\frac{R^2 - 1}{N^2 R^2 - 1}}\right], \text{wherein}$$

R is a compression ratio used for rectification and N is the index of refraction of the material of which the optical element is formed.

8. An optical system according to claims 5, 6 or 7 in which said second optical surface is a plano surface.